United States Patent [19]

Eickmann

[11] 4,303,004

[45] Dec. 1, 1981

[54] SNAP RING ASSEMBLY FOR TWO BODIES

[76] Inventor: Karl Eickmann, 2420, Isshiki, Hayama-machi, Kanagawa-ken, Japan

[21] Appl. No.: 12,996

[22] Filed: Feb. 21, 1979

Related U.S. Application Data

[63] Continuation-in-part of Ser. No. 911,246, May 31, 1978.

[51] Int. Cl.³ .......................... F01B 13/06; F16D 3/8

[52] U.S. Cl. .......................... 91/488; 64/8; 64/31

[58] Field of Search .......................... 64/7, 8, 31; 91/491, 91/488; 92/157, 187

[56] References Cited

U.S. PATENT DOCUMENTS

| | | | |
|---|---|---|---|
| 2,815,993 | 12/1957 | Schweitzer | 92/187 |
| 2,854,829 | 10/1958 | Porter | 64/7 |
| 3,098,365 | 7/1963 | Pearson | 64/7 |
| 3,670,630 | 6/1972 | Tyson | 92/187 |
| 3,733,853 | 5/1973 | Sutliff | 64/7 |
| 4,037,523 | 7/1977 | Eickmann | 91/491 |

FOREIGN PATENT DOCUMENTS

| | | | |
|---|---|---|---|
| 2118712 | 11/1972 | Fed. Rep. of Germany | 91/488 |

*Primary Examiner*—William L. Freeh

[57] ABSTRACT

For an assembly of two bodies wherein one of the bodies has a part-ball portion and the other has a part-ball formed hollow seat of complementary surface, a slot is provided in the body with the hollow portion and the ball formed portion of the other body is mounted into the hollow portion, while a spring washer presses the bodies together when a snap ring having an extension engaging into the slot and being kept in a ring groove is inserted into the hollow portion. The body with the ball formed portion has retaining faces which are engaged by the washer and the washer also has an extension to enter into the slot, whereby the assembly assures, that one of the bodies can pivot relatively to the other body, but that the bodies are prevented from rotational movements relatively to each other.

9 Claims, 8 Drawing Figures

Fig. 1
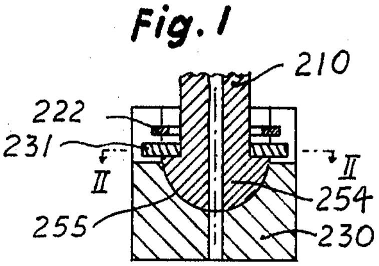
Fig. 4
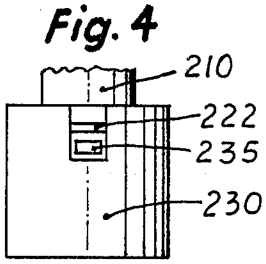
Fig. 5
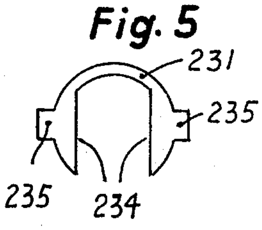
Fig. 2
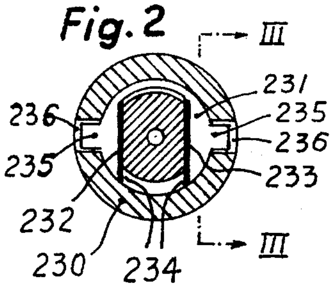
Fig. 3
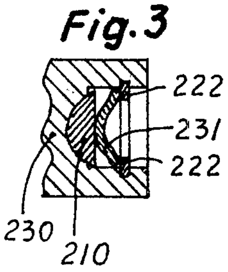
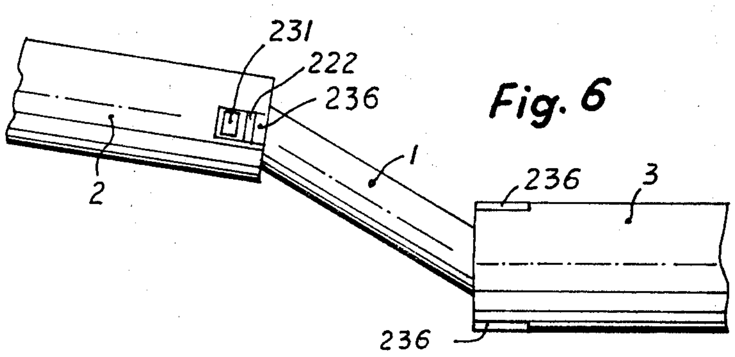
Fig. 7
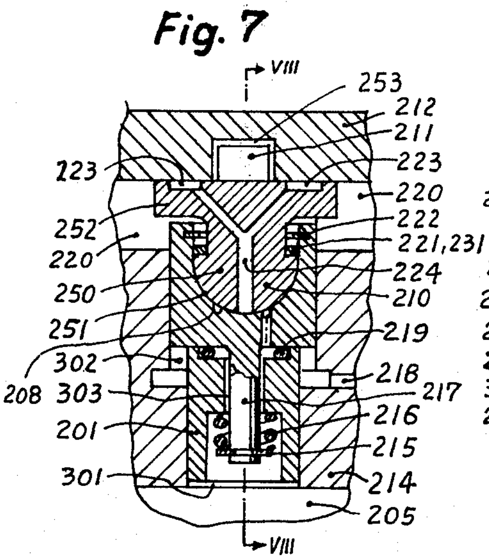
Fig. 8
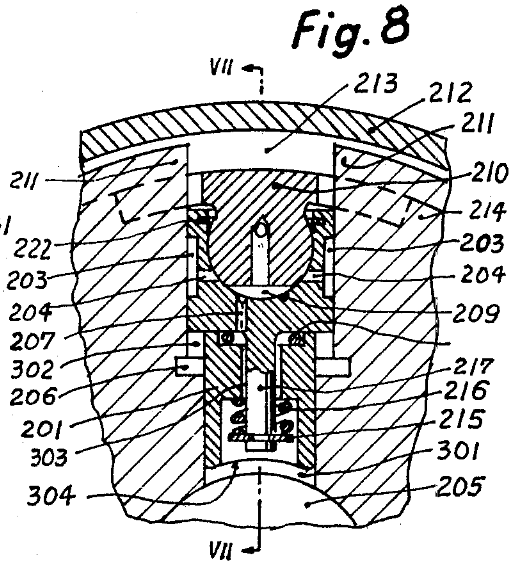

SNAP RING ASSEMBLY FOR TWO BODIES

CROSS REFERENCE TO RELATED APPLICATION

This is a continuation in part application of my co-pending patent application Ser. No. 911,246, filed on May 31, 1978.

BACKGROUND OF THE INVENTION

It is known to set snap rings radially from inside into a groove in a cylindrical face or bore. The snap ring widens and fastens itself under own spanning force in the respective annullar groove. However, the known snap rings did not allow one body to pivot on another body and prevent rotation of one of the bodies relatively to the other body.

It is the intention of this invention to provide an assembly of two bodies which remain able to pivot ralatively to each other, which are fastened to each other and which are prevented from rotation relatively to each other by an assembly of two rings, whereof at least one ring is a snap ring.

SUMMARY OF THE INVENTION

It is the primary object of this invention to fasten one body inside of another body, to prevent rotation of one of said bodies relatively to the other of the bodies, to press the bodies together and to enable one of the bodies to pivot relatively to the other body.

Another object of the invention is to provide flexible shafts with ability to transfer torque by the assembly of a number of bodies to become the desired flexible shaft.

The objects of the invention are materialized thereby, that one body has a hollow seat with a bearing face of part-ball -form configuration for pivotably bearing thereon a part-ball formed portion of an other body. The other body has parallel plane faces on the outer end of the ball formed portion. The one body has an annular ring groove endwards of said hollow seat and a slot extending normal to the axis of the seat. One axially flexible and spanned ring has faces which engage the parallel plane faces and an extension inserted into the slot of the other body for prevention of rotation. A snap ring is inserted into the annular groove of the other body for spanning axially the spanned ring. Thereby the assembly is kept together, relative rotation of one of the bodies to the other body is prevented and the one body can pivot in the seat relatively to the other body.

More details will become appearant from the drawing and the description of the preferred embodiment.

BRIEF DESCRIPTION OF THE DRAWING

FIG. 1 is a longitudinal section through an assembly of the invention;

FIG. 2 is a cross-sectional view through FIG. 1 along line II—II;

FIG. 3 is a cross-sectional view through FIG. 2 along line III—III;

FIG. 4 is a view onto the assembly of FIG. 1 along IV—IV;

FIG. 5 is a view upon a ring of the assembly,

FIG. 6 is a view onto a torque transfering flexible shaft of the invention;

FIG. 7 is a longitudinal sectional view through the assembly of the invention for provision of a piston-piston-shoe assembly; and FIG. 8 is a cross-sectional view through FIG. 7 along line VIII—VIII.

DESCRIPTION OF THE PREFERRED EMBODIMENT

First body 230 has a hollow portion forming therein a part-ball-formed seat 255. The second body 210 has an end portion of part-ball configuration 254 with an outer face corresponding complementary to the seat 255 of the first body. The seat and the end portion of the bodies have substantially equal radii around a common centre point. The first body carries the second body in the seat. The second body has a narrowed portion 210 radially of the end portion 254. The first body has an outer portion of substantially cylindrical inner configuration extending from the seat to the end of the first body. The narrowness of the narrowed portion makes it possible for the second body to pivot in the seat and in the hollow outer portion of the first body.

The narrowed portion 210 of the second body has two parallel planar faces 232 and 233. An axial span-ring 231 which is also illustrated separately in FIG. 5, is radially open in a width corresponding to the distance between the two parallel face-portions 232 and 233 of the second body 210. Thereby the axial span ring 231 can be moved along the face portions 232 and 233 of the second body to engage the parallel faces 232 and 233. The axial span ring 231 has also at least one, but in the figures two, fingers 235 which extend radially outwards from the span-ring.

The first body 230 has in its hollow end portion or outer portion an annullar ring groove for the insertion of a snap ring 222 and and at least one slot, but in the FIG. 2 slots, 236 which extend radially through the hollow end portion or outer portion.

The fingers 235 are inserted into the slots 236, whereby a rotation of the span ring 231 is prevented. The snap ring 222 which may be commonly known standard snap ring or which may be of specially fitting configuration, becomes axially moved into the hollow outer portion of the first body until it meets the span-ring. The snap ring is then forced axially against the span-ring, so, that the span-ring becomes axially compressed until the snap-ring 222 reaches the annular ring groove and snaps into the ring groove to become to rest therein. The span ring 231 is bowed as seen in FIG. 3 to have an axial thrust. The bowing is actually greater than shown in FIG. 3, so, that an axial spanning will already have occured, when the snap ring enters into the annular groove of the first body.

On the end of the ball-formed portion of the second body are partial ends with shoulders provided which extend radially inwardly until they meet the mentioned parallel faces 232 and 233.

The span-ring 231 presses with its inward end face(s) against the shoulders of the partial ends of the ball formed portion of the second body, whereby the part-ball 254 of the second body is pressed into the seat 255 of the first body. The span-ring 231 is borne by its outward face on the snapring 222.

The parallel faces 232 and 233 of the second body 210-254 are engaged by the parallel inner faces 234 of the span-ring 231.

The assembly is then completed. The second body can pivot between the parallel inner faces of span ring 231. Rotary motion of one of the bodies can be transfered under torque over the described parallel faces, the span-ring, the fingers and the slots from one of the bodies to the other body.

The assembly can also be used to prevent rotation of the other body when one of the bodies is prevented from rotation. Such arragement is especially suitable when the second body is a piston shoe of a pump or motor which is guided not to revolve. The first body can then be a piston of a pump or motor. The piston is then prevented from rotation and can become provided with fluid pressure fields in specific locations in its outer surface.

The flexible shaft assembly of FIG. 6 can be used, if so desired, to transfer axial thrust and rotary torque.

The medial body 1 corresponds to the second body of the other figures, but has part-ball portions, ends and parallel faces 254,232 and 233 on both ends with the further specifity, that the parallel faces 232,233 of one of the ends are normal to those of the other end. A respective clearance may be provided between the parallel faces 232,233 and the adjacent parallel faces 234 in order to make a slight spherical movement possible when one of the first bodies 2 or 3 of the flexible shaft assembly becomes displaced from the axis of the other first body 2 or 3.

The body assembly of the invention may also be used as an assembly of a piston with a piston shoe for radial piston pumps, motors, compressors, transmissions. Under certain circumstances also for axial piston devices.

In the following the assemblies of FIGS. 1 to 5 and 7 to 8 will be discussed under the condition, that the first body is a piston and the second body is a piston shoe in a radial piston device with cylinder chambers, wherein the pistons move and wherein fluid flows through the cylinders. At this following description the terminology will partially be changed to correspond to hydraulic or pneumatic device application. The parts may thereby obtain other names than were used in the description herebefore.

At very high pressure the swing portion 254 in FIG. 1 or 250 in FIG. 7 in a swing bed 255 in FIG. 1 or 251 in FIG. 7 of a piston 230 in FIG. 1 or 202 in FIG. 8 may wear off. It is therefore desired to prevent a clearance between the swing portion 254 and the bed 255.

That is obtained by the embodiment of FIGS. 1 to 5 and 7 to 8 by way of example. The embodiment therefore inserts a deflectible spring means 231 in FIG. 1 or 221 in FIG. 7 between a shoulder of the swing portion 254 of the piston shoe and a holding means 222 in the piston. This spring means 231 is outwardly borne on the holding means, for example snap ring 222 and presses against the shoulder of the swing member 254, whereby the piston shoe swing portion 254 is pressed onto the wall 255 of the swing bed 255 of the piston 230. Leakage and play between piston and piston shoe is thereby prevented.

For the application of the tangential fluid pressure pockets in the walls of the piston or for the application of dead space prevention on the piston-bottom or for other purposes it is often desired to prevent rotation of a piston relatively to the piston shoe. That is not easy in spherical or ball-formed swing portions and beds.

According to the invention, the relative rotation between piston 230 and piston shoe 210 may be prevented by the provision of parallel plane faces 232-233 as in FIG. 2 on the piston shoe neck 210, the provision of recesses 236 as in FIGS. 1,2,4 in the piston and the provision of plane inner faces 234 and holders 235 as in FIG. 5 on the spring-thrust-ring 231. The holders 235 are entered into the recesses 236. Thereby the rotation of the ring 231 in the piston 230 is prevented. The inner faces 234 engage and embrace the plane parallel faces 232 and 233 of the piston shoe neck and thereby the rotation of the piston shoe relatively to the spring ring 231 is prevented.

FIG. 3 demonstrates the spring-press-action of ring 231 and FIG. 2 shows the configuration of spring ring 231. Thus, relative rotation between piston shoe and piston is prevented. The end portion 254 of body 210 in FIGS. 1 to 4 may also be applied as end portion 250 of piston shoe 210 of FIGS. 7 and 8; the hollow seat 255 of body 230, annular groove 222 and slot 236 of body 230 of FIGS. 1 to 4 may a so be applied on piston 202 as seat 251 and groove 222. Span-ring 231 of FIGS. 1 to 5 may be applied as ring 221 in FIGS. 7 and 8.

As will be seen, the invention is also suitable for fluid machines with high pressure. At such high pressure difficulties can arise at the pivot-connection between piston and piston shoe. When the piston shoe is borne in a portion of the piston or when the piston is borne in a portion of the piston shoe, the cross-sectional area of the pivot-connection or of the swing bearing is less than the cross-sectional area of the piston. The load at the bearing faces of the swing bearing or pivot-bearing can then become so very high, that the faces wear of or weld. It is therefore also an aim and object of the invention to reduce such wear off, delate the welding to still higher pressure or to improve the bearing capacity of the swing- or pivot-bearing between piston and piston-shoe to a still higher pressure.

Such possibility is demonstrated in FIGS. 7 to 8.

In the embodiment of FIGS. 7 and 8 of the invention the rotor 214 is provided with cylinders 301 and guide cylinders 302. The guide cylinders 302 are radially outside of the cylinders 301 located. The cylinders 301 are seal cylinders to act as the other cylinders of the other figures of the invention.

Cylinders 301 and 302 have substantially the same axis. It is however difficult to machine cylinders of different diameters exactly around equal axes. It is therefore another object of the invention to permit a limited derivation of one of the cylinders relatively to the axis of the other of the cylinders 301 and 302. Guide cylinder 302 has a bigger diameter than the seal cylinder 301. In seal cylinder 301 the seal-piston 201 reciprocates, while in guide cylinder 302 the guide piston 202 which may also be called the drive piston 302 reciprocates. Both pistons reciprocate in unison.

In order to materialize the described desired object, that a machining the guide cylinder and the seal cylinder may be permitted to obtain axes which are not exactly equal, but which may have a little distance from one another or may even get a little inclination relatively to each other the guide piston 202 receives a relative sidewards moveability relatively to the seal piston.

That is obtained thereby, that the seal piston 201 is fastened to the guide piston only in radial direction. Guide piston 202 has a radial inward extension 217 which extends through a recess 303 of seal piston 201. Recess 303 is wider than the extension 217. Consequentely the seal piston 201 can move normal to the axes of said pistions relatively to the guide piston. Thus, if the axes of the pistons are unequal that can not lead to welding of any of the pistons, because they can depart relatively to each other from the axis of the other piston.

Piston extension 217 may carry a holding member 215 for fastening seal piston 201 radially onto the guide piston 202. It is preferred to insert thrust spring means 216 between a shoulder or bottom portion of seal piston 201 and holding member 215 in order to keep both pistons together. Thereby a suction-or outward-stroke the guide piston 202 tracts also the seal piston 201 outwards. The recess 303 may be of a cornered cross-section in order to facilitate a cornered extension 217. If that is applied, another feature is materialized, namely the prevention of rotation of the seal piston relatively to the guide piston. Such prevention is especially then desired, when there shall be all dead space be prevented in the fluid machine. The described rotation prevention means of recess 303 and of extension 217 makes it possible to form the bottom portion of the seal piston with a radius 304 substantially equal to the outer radius of control body 205. That prevents dead space in the seal cylinder 301.

The bottom of the guide cylinder 302 may be communicated to the interior of the housing of the fluid machine or to a space under no or under low pressure by communication passage 218. This must be of enough cross-sectional area in order to allow air or fluid to enter and leave the interior of the guide cylinder 302 with little friction in fluid. Seal means or flexible seal means for example O-rings 219 may be inserted between the guide piston and the seal piston to prevent leakage of the lubrication and pressure supply fluid which communicates between the both pistons. The guide piston 202 may carry a piston shoe 210 which with its outer face is guided on the piston stroke actuator guide 212. A fluid pressure pocket 209 may be provided between the guide piston and the piston shoe for the lubrication and pressure reduction of the pivot portion and bed of piston and shoe. Additional annullar recess (s) 208 may be added to further lubricate the swing portion faces and to further reduce their pressure loads. The communication and flow of fluid from the seal cylinder into the fluid pressure pockets 209,208,223 is materialized through recess 303 and communication passages 207,224 in the guide piston and in the piston shoe. Fastening means 221,223 may hold the swing portion 250 of piston shoe 210 in the swing bed 251 of guide piston 202.

For the obtainment of a large piston stroke in a relatively little diameter of the rotor 214 the rotor may have radial extensions 211 between cutt off annular recesses 220 in order to facilitate the entering of the guide portions 252 of the piston shoes 210 into the said recesses 220. Actuator guide 212 may for the same purpose of a long piston stroke have an annullar ring groove 253 for the reception of the segments 211 of the radial extension 211. The piston shoe central portion 210 can then move freely in the cylinder recesses 213, whereby the said large piston stroke is obtained. Fluid pressure pockets 223 reduce the force of the piston shoe against the stroke actuator 212 and thereby reduce the friction therebetween.

At large piston strokes at small rotor diameters and small piston stroke actuator diameters the piston shoe pivots in the guide piston with a great angle. The piston wall of the guide piston 202 is thereby pressed against a portion of the wall of the guide cylinder 302. In order to prevent or to reduce the friction there, the fluid pressure tangential pockets 203 are provided in the walls of the guide piston 202, and peridically supplied with pressure and fluid by the control-recess 209 over the communication passages 204. Tangential recesses may act also at the cylinder wall portions along the radial extensions 211, especially at large piston strokes.

Since the guide piston 202 has only to transfer the radial thrust onto the seal piston 201 to carry the piston shoe and in case of need to provide the tangential fluid pressure pockets 203, but not to seal radially at all, the guide piston may, in order to obtain the desired large piston stroke, mainly operate between the rotor segments 211 and thereby at leat partially outside of the uninterrupted circular portion of the guide cylinder 302. The bottom of guide cylinder 302 may have an inter secting recess 206 for the easier machining of the walls of the guide cylinder 302.

While the actions and applications and locations of the embodiments of the invention or parts thereof are described singularily in this specification, it should be understood, that they may also be used at other embodiments or in devices of the former art if suitably applied. Additional novel embodiments may be obtained by other combinations of the embodiments of the invention than those which have been particularily described without leaving the scope of the invention.

While some embodiments of the assembly of the invention ha e been described, it should be understood, that more modifications be possible and the scope of the invention shall therefore be limited only by the following claims.

I claim:

1. An assembly of two bodies, including:

a first body, a second body, a span ring and a snap ring; wherein said first body has a hollow end portion forming in said endportion a seat with a seat face of a radius around a common centre whereby the said seat obtains the form of substantially a hollow half ball, wherein said second body has an end portion in the form of substantially a half ball with a radius corresponding to said radius and around said common centre, whereby said end portion of said second body is swingably borne on said seat of the said first body, wherein said second body has two parallel face portions on a narrowed portion inwards of said half-ball formed end portion, wherein said second body has between said half-ball formed end portion and said parallel face portions medial partial ends with shoulders substantially normal to said parallel face portions, wherein said first body has an annular ring groove extending radially from inside into said end portion of said first body, wherein said first body has at least one slot extending radially through said end portion of said first body, wherein an axial span-ring is inserted into said hollow end portion of said first body, wherein said span-ring is bowed under force towards said shoulders, wherein said span-ring has at least one radially extending finger, wherein said finger is inserted into said slot, wherein said span-ring has a radial opening defined by two parallel inner faces, wherein said parallel inner faces are facing said parallel face portions of said second body, wherein a snap ring is inserted under thrust against said span-ring into said annullar ring groove in said first body and wherein said span-ring is prevented from rotation relatively to said first body to said finger in said slot and rotation of said second body relatively to said span-ring is prevented by said parallel faces and the said bodies are kept together in said seat by thrust of said span ring onto said shoulders of said second body, while the ability of relative pivot motion between said bodies remains maintained.

2. The assembly of claim 1, wherein said second body has an other end substantially equal to said end and being mounted into a third body, wherein said third body is substantially equal to said first body and wherein said assembly forms a flexible shaft.

3. The assembly of claim 2, wherein said flexible shaft includes a plurality of said first bodies and said second bodies, wherein the slots on said first bodies are at different ends of the first bodies set under an angle normal to the respective slot on the other end, and wherein said flexible shaft has the capability to transfer rotary torque and axial thrust.

4. An assembly of two bodies, including a first body, a second body, a spring ring and a snap ring, wherein said first body is a piston reciprocating in a radial piston machine and has a hollow upper end portion forming in said endportion a seat with a seat face of a radius around a common centre whereby the said seat obtains the form of substantially a hollow half ball, wherein said second body is a piston shoe pivotably connected to said piston and having an outer face to be guided along an actuator face for transferation of a stroke from said actuator face to said piston;

wherein said second body has an end portion in the form of substantially a half ball with a radius corresponding to said radius and around said common centre, whereby said end portion of said second body is swingably borne on said seat of the said first body, wherein said second body has two parallel face portions on a norrowed portion inwards of said half-ball formed end portion, wherein said second body has between said half-ball formed end portion and said parallel face portions medial partial ends with shoulders substantially normal to said parallel face portions, wherein said first body has an annular ring groove extending radially from inside into said end portion of said first body, wherein said first body has at least one slot extending radially through said end portion of said first body, wherein an axial span-ring is inserted into said hollow end portion of said first body, wherein said span-ring is bowed under force towards said shoulders, wherein said span-ring has at least one radially extending finger, wherein said finger is inserted into said slot, wherein said span-ring has a radial opening defined by two parallel ring faces, wherein said parallel ring faces are facing said parallel faces of said second body, wherein a snap ring is inserted under thrust against said span-ring into said annular ring groove in said first body and wherein said span-ring is prevented from rotation relatively to said first body to said finger in said slot and rotation of said second body relatively to said span-ring is prevented by said parallel faces and the said bodies are kept together in said seat by thrust of said span-ring onto said shoulders of said second body, while the ability of relative pivot motion between said bodies remains maintained.

5. The assembly of claim 4, wherein said piston is reciprocating in a cylinder of a rotor of a radial piston machine, wherein said actuator face is a cylindrical face, wherein said cylinder is located in a fluid containing body having a first axis, wherein said actuator face is formed around a second axis, parallel to said first axis but eccentrically distanced from said first axis, for actuation of said stroke when said actuator moves relatively to said fluid containing body and wherein said piston is moved in said cylinder by said stroke.

6. The assembly of claim 5, wherein said cylinder includes an inner cylinder of a smaller diameter and an outer cylinder of a bigger diameter, wherein said piston includes an inner piston of a smaller diameter and an outer piston of a bigger diameter, wherein said outer portion is provided with said seat, said ring groove, said slot and holds said rings and said end portion of said second body, wherein said inner piston is connected flexibly to said outer piston, and wherein the flexible connection between said pistons permits a limited radial displacement of the axis of said outer piston relatively to the axis of said inner piston.

7. The assembly of claim 5, wherein said actuator face is provided on a piston stroke actuator which includes means for the prevention of rotation of said piston shoe and wherein said piston is prevented from rotation relatively to said piston shoe by said finger(s) and parallel faces of said spring ring in said slot(s) in said piston and along said parallel face portions of said piston shoe.

8. The assembly of claim 5, wherein said end portion of said second body is a pivot portion of said piston shoe and having a recess in said pivot portion; wherein said piston has a communication passage from said cylinder through said piston into said hollow end portion, wherein said piston includes at least one recess in its outer diameter for sliding along a portion of the wall of the cylinder wherein the piston moves, wherein a passage extends from said recess through a portion of said piston into said hollow portion, wherein said recess in said pivot portion and said passage in said piston portion are so located that said recess in said outer diameter of said piston is alternately communicated and discommunicated to said recess in said pivot portion when said piston shoe pivotes relatively to said piston, whereby angular dislocation of said recess in said outer diameter of said piston is prevented by said outer face which is guided on said actuator, said parallel face portions of said narrowed portion, said parallel inner faces, said rings and said finger in said slot.

9. The assembly of claim 8, wherein said piston includes an outer piston and an inner piston, wherein said outer piston has a bigger diameter than said inner piston, wherein said outer piston reciprocates in an outer cylinder, wherein said inner piston reciprocates in an inner cylinder, wherein the diameters of the cylinders correspond substantially to the diameters of the pistons respectively, wherein said pistons are flexibly connected to each other, wherein said inner piston is slightly displaceable relatively to the axis of said outer piston, wherein said inner piston includes a passage from said inner cylinder through said inner piston to said outer piston, wherein a seal means is provided between said outer piston and said inner piston to seal said passage through said inner piston for prevention of loss of fluid between said pistons, wherein said hollow portion is provided in said outer piston, wherein said half ball formed end portion of said piston shoe is borne in said hollow portion of said outer piston, wherein said recesses of claim 6 and said passages of claim 6 are provided in said outer piston wherein said alternately communication and discommunication is provided in said outer piston, and wherein said recess in said outer diameter of said outer piston carries fluid under pressure to the respective portion of the wall of said outer cylinder to reduce friction between said outer piston and the wall of said outer cylinder.

* * * * *